United States Patent
Luo et al.

(10) Patent No.: US 11,876,573 B2
(45) Date of Patent: Jan. 16, 2024

(54) REPEATER COMMUNICATION SYSTEM WITH SUB-BAND POWER MEASUREMENT CAPABILITY

(71) Applicant: QUALCOMM Incorporated, San Diego, CA (US)

(72) Inventors: Jianghong Luo, Skillman, NJ (US); Navid Abedini, Basking Ridge, NJ (US); Junyi Li, Fairless Hills, PA (US); Tao Luo, San Diego, CA (US); Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/384,694

(22) Filed: Jul. 23, 2021

(65) Prior Publication Data

US 2023/0026827 A1    Jan. 26, 2023

(51) Int. Cl.
*H04B 17/40* (2015.01)
*H04B 7/155* (2006.01)

(52) U.S. Cl.
CPC ......... *H04B 17/40* (2015.01); *H04B 7/15535* (2013.01)

(58) Field of Classification Search
CPC .............................. H04B 7/15535; H04B 17/40
See application file for complete search history.

(56) References Cited

U.S. PATENT DOCUMENTS

| | | | | |
|---|---|---|---|---|
| 11,546,047 B2* | 1/2023 | Ray Chaudhuri | . | H04B 7/15557 |
| 2010/0220808 A1* | 9/2010 | Kishigami | ..... | H04L 25/0232 |
| | | | | 375/295 |
| 2012/0322506 A1* | 12/2012 | Li | ..... | H04W 72/082 |
| | | | | 455/561 |
| 2013/0089021 A1* | 4/2013 | Gaal | ..... | H04B 7/155 |
| | | | | 370/315 |
| 2013/0260703 A1* | 10/2013 | Actis | ..... | H03F 3/602 |
| | | | | 330/297 |
| 2017/0026104 A1* | 1/2017 | Lange | ..... | H03F 3/24 |
| 2018/0102861 A1* | 4/2018 | Ashworth | ..... | H04B 7/15578 |

(Continued)

FOREIGN PATENT DOCUMENTS

| | | |
|---|---|---|
| CN | 208797941 U | 4/2019 |
| WO | WO-2016205399 A1 | 12/2016 |

OTHER PUBLICATIONS

International Search Report and Written Opinion—PCT/US2022/073081—ISA/EPO—dated Oct. 7, 2022.

*Primary Examiner* — Rasheed Gidado

(74) *Attorney, Agent, or Firm* — Arun Swain

(57) ABSTRACT

This disclosure provides systems, methods, and devices for wireless communication that support techniques for operating repeaters based on sub-band power measurements. According to some aspects, sub-band-based power measurements may also allow a repeater to acquire other side information, e.g., time division duplex (TDD) downlink/uplink information or beam configuration information, more accurately. In aspects, a repeater determines one or more sub-band received-signal powers associated with one or more sub-bands of a bandwidth available for wireless communication, amplifies one or more signals received within at least one of the one or more sub-bands, and transmits the amplified one or more signals to at least one of a user equipment (UE) or a base station.

30 Claims, 4 Drawing Sheets

(56) References Cited

U.S. PATENT DOCUMENTS

2020/0228182 A1* 7/2020 Nilsson ................ H04B 7/0647
2020/0275522 A1* 8/2020 Chervyakov ......... H04W 76/28
2020/0322037 A1 10/2020 Abedini et al.

* cited by examiner

REPEATER COMMUNICATION SYSTEM WITH SUB-BAND POWER MEASUREMENT CAPABILITY

TECHNICAL FIELD

Aspects of the present disclosure relate generally to wireless communication systems, and more particularly, to techniques for operating repeaters based on sub-band power measurements capabilities. Some features may enable and provide improved communications, including higher data rates, higher capacity, better spectral efficiency, and higher reliability.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple-access networks that support communications for multiple users by sharing the available network resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless communication network may include several components. These components may include a number of base stations or network access nodes that may simultaneously support communication for multiple communication devices (e.g., user equipment (UE)). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio-frequency (RF) transmitters. On the uplink, a transmission from the UE may encounter interference from uplink transmissions of other UEs communicating with the neighbor base stations or from other wireless RF transmitters. This interference may degrade performance on both the downlink and uplink. Additionally, some wireless signals transmitted within a wireless communication system may be limited by path-loss through the air, physical blockers, or other constraints.

To address the wireless communication performance degradation issues, wireless communications systems may use wireless repeaters to repeat and extend signals sent between various system nodes. A signal received at a repeater may be a signal transmitted by a base station intended for a UE, a signal transmitted by a UE intended for a base station, a signal transmitted by one UE intended for another UE, or a signal transmitted by one base station intended for another base station.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a wireless communication device includes determining one or more sub-band received-signal powers associated with one or more sub-bands of a bandwidth available for wireless communication, amplifying one or more signals received within at least one of the one or more sub-bands, and transmitting the amplified one or more signals to at least one of a user equipment (UE) or a base station.

In an additional aspect of the disclosure, a wireless communication device includes at least one processor, and a memory coupled to the at least one processor. The at least one processor is configured to determine one or more sub-band received-signal powers associated with one or more sub-bands of a bandwidth available for wireless communication, to amplify one or more signals received within at least one of the one or more sub-bands, and to transmit the amplified one or more signals to at least one of a UE or a base station.

In an additional aspect of the disclosure, a wireless communication device configured for wireless communication includes means for determining one or more sub-band received-signal powers associated with one or more sub-bands of a bandwidth available for wireless communication, means for amplifying one or more signals received within at least one of the one or more sub-bands, and means for transmitting the amplified one or more signals to at least one of a UE or a base station.

In an additional aspect of the disclosure, a non-transitory computer-readable medium stores program code. The program code includes program code executable by a computer for causing the computer to determine one or more sub-band received-signal powers associated with one or more sub-bands of a bandwidth available for wireless communication, to amplify one or more signals received within at least one of the one or more sub-bands, and to transmit the amplified one or more signals to at least one of a user equipment (UE) or a base station.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
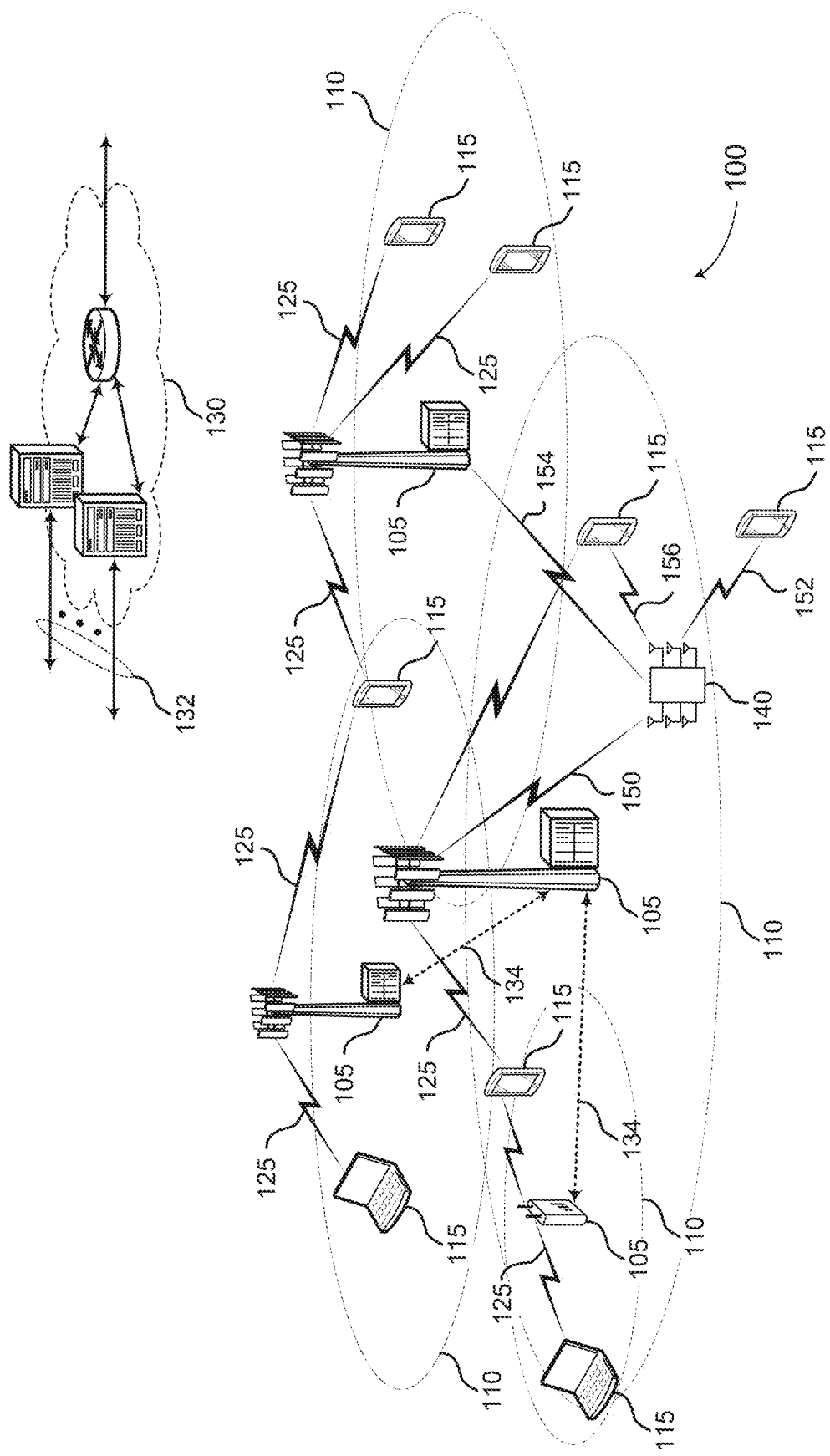
FIG. 1 is a block diagram illustrating details of an example wireless communication system that includes a repeater according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often sub-divided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

The systems and techniques described in this disclosure also provide various repeater communication system ("repeater") techniques and mechanisms, such as techniques for measuring signal power within repeaters on a sub-band basis, for operating repeaters based on sub-band power measurements, and for optimizing amplification parameters of repeaters based on signal characteristics. Some repeaters within a wireless communication system may be designed to be layer 1 millimeter wave repeaters (L1 mmW repeaters). These repeaters may include a low frequency interface (e.g., LTE, sub-6 GHz NR, Wi-Fi, Bluetooth, or other communication protocol) and a high frequency interface (e.g., a mmWave interface). A L1 mmW repeater may be able to receive and forward a mmWave signal (e.g., with some internal signal processing, such as applying a gain to the received signal before forwarding the amplified signal), but may not be able to further interpret the content of a signal received on its mmW interface or generate new content for a mmW signal to be transmitted on the mmW interface. As one example, in some implementations, a L1 mmW wave repeater may lack at least some of the physical layer, medium access control, and radio resource control (PHY/MAC/RLC) (or higher layers) protocol stack on the mmW interface that would be present in layer 2 or layer 3 repeaters to interpret the content of a received mmW signal or generate new content for a mmW signal.

These limitations of a L1 mmW repeater may make it more difficult to perform certain access procedures, association procedures, and/or beam management procedures within the wireless communication system. For example, when a base station and a L1 mmW repeater exchange messages via a mmW interface, the L1 mmW repeater may not be able to interpret the content of the received messages, such as downlink reference signals (e.g., a synchronization signal block (SSB), a channel-state information reference signal (CSI-RS), etc.). Similarly, as another example, the L1 mmW repeater may not be able to generate content for uplink reference signals (e.g., a sounding reference signal (SRS), etc.) on the mmW interface. These uplink and downlink reference signals could allow the base station and repeater to better identify a preferred beam pair link. However, if the repeater cannot interpret or generate these types of reference signals on the mmW interface, then alternative approaches would be desired.

To enhance the operation of a wireless communication system that includes one or more repeaters, the repeaters may be equipped with power measurement and reporting capabilities. For example, a L1 mmW repeater may include a power detector that can measure the power of a signal received on the mmW interface (e.g., the power of a wideband analog mmW signal). The repeater may take one or more actions based on the power level measured at the repeater. As one example, the repeater may use the power level information to set one or more communication parameters locally at the repeater (e.g., internal gain level, internal beam management parameters or configurations, etc.). As another example, the repeater may report the power measurement to another device, such as a serving base station. When the repeater is a L1 mmW repeater that does not generate new content for a mmW signal to be sent on the repeater's mmW interface, the L1 mmW repeater may use a side channel, such as the low frequency interface of the L1 mmW repeater, to send the report. The low frequency interface of the repeater may include functionality to interpret content from received messages and generate content for new messages. The device (e.g., base station) that receives the report may then set one or more communication parameters based on the power measurement (e.g., set a gain level of the repeater, set a transmission power level of a transmitting device, set a beamforming configuration, set other beam management parameters, set repeater associations, etc.). The ability to measure power metrics at the repeater may serve to improve the access, association, and/or beam management procedures within a wireless communication system that includes repeaters. Further details will be described below regarding the power measurement, power measurement reporting, and further actions that may be taken based on the power measurements.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system 100 that includes a repeater 140 according to some aspects of the present disclosure. The wireless communication system 100 includes base stations 105, UEs 115, and a core network 130.

In some examples, the wireless communication system 100 may be a LTE network, an LTE-Advanced (LTE-A) network, an LTE-A Pro network, a 5G NR network, or another type of network. In some cases, wireless communication system 100 may support enhanced broadband communications, ultra-reliable (e.g., mission critical) communications, low latency communications, or communications with low-cost and low-complexity devices. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as "FR2") that exists above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115, another base station 105, or a repeater 140. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115 or repeater 140) a beam direction for subsequent transmission and/or reception by the base station 105. Additionally, a UE 115 or repeater 140 may perform similar beamforming operations (as described herein for the base station 105) for directional communications with other devices (e.g., a base station, a UE, or another repeater).

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115 or repeater 140, which may be examples of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 or a repeater 140 may have one or more antenna arrays that may support various MIMO or beamforming operations.

An individual node (e.g., base station, UE, or repeater) within the wireless communications system 100 may include multiple different communication interfaces each configured for a different type of communication protocol. As one example, a base station 105, a UE 115, or a repeater 140 may include both a wide area network interface (e.g., 4G or 5G cellular) and a local area network interface (e.g., IEEE 802.11 Wi-Fi, or Bluetooth). As another example, a base station 105, a UE 115, or a repeater 140 may include both a high frequency network interface (e.g., mmWave) and a lower frequency network interface that uses a lower frequency band than the mmWave interface (e.g., LTE, sub-6 GHz NR, Wi-Fi, Bluetooth, etc.).

Wireless communications system 100 may include one or more wireless repeaters 140 (also known as a relay). The wireless repeaters 140 may include functionality of base station 105 and/or UE 115 for repeating, forwarding, relaying, extending, and/or redirecting wireless signals. In some cases, a wireless repeater 140 may be used in line of site (LOS) or non-line of sight (NLOS) scenarios. In a LOS scenario, transmissions, such as mmW transmissions, may be limited by path-loss through air, which may be overcome using beamforming techniques at the wireless repeater 140. In a NLOS scenario, such as in an urban area or indoors, mmW transmissions may be limited by signal blocking or signal interfering physical objects.

The repeater 140 may provide an uplink path from a UE to a base station, a downlink path from a base station to a UE, a P2P or D2D path from one UE to another UE, and/or a wireless backhaul path between the base station and a core network device (e.g., via one or more other base stations). In a first example, a mmW beamforming repeater 140 may be utilized to receive a signal from a base station 105 and transmit the signal to the UE 115, such as by receiving the signal on wireless link 150 and then transmitting the signal on wireless link 152. In a second example, a mmW beamforming repeater 140 may be utilized to receive a signal from a UE 115 and transmit the signal to the base station 105, such as by receiving the signal on wireless link 152 and then transmitting the signal on wireless link 150. In a third example, a mmW beamforming repeater 140 may be utilized to receive a signal from one base station 105 and transmit the signal to a different base station 105 (e.g., in a wireless backhaul configuration), such as by receiving the signal on wireless link 150 and then transmitting the signal on wireless link 154. In a fourth example, a mmW beamforming repeater 140 may be utilized to receive a signal from one UE 115 and transmit the signal to a different UE 115 (e.g., in a P2P or D2D protocol configuration), such as by receiving the signal on wireless link 152 and then transmitting the signal on wireless link 156. In each of these examples, the signal transmitted may be a processed version of the received signal (e.g., an amplified version of the received signal with or without further processing such as signal phase shifting, splitting, and/or combining). Beamforming and gain control techniques may be utilized to improve signal quality between the base station 105, repeater 140, and UE 115 by isolating signals (e.g., via beamforming) and improving or maintaining stability within a signal processing chain of the repeater (e.g., via gain control).

The mmW wireless repeater 140 may include an array of reception antennas and an array of transmission antennas. In some cases, the array of reception antennas and the array of transmission antennas comprise the same set of dual-pole antennas, wherein the dual pole antennas function in a first polarization as the array of reception antennas and the dual pole antennas function in a second polarization as the array of transmission antennas. In some cases, the antennas comprise meta-material antennas or antenna arrays. The repeater 140 may further include a beam control system, which may comprise a processor or system on chip (SoC) for controlling transmit and/or receive beams to reduce signal interference caused by retransmission.

In some cases, the mmW wireless repeater 140 is an analog RF repeater, and the mmW wireless repeater 140 may include a signal processing chain connected (e.g., coupled, linked, attached) between the array of reception of antennas and the array of transmission antennas. The signal processing chain may be implemented as a radio frequency integrated circuit (RFIC), which may include RF/microwave components such as one or more phase shifters, (low noise amplifiers) LNAs, (power amplifiers) PAs, PA drivers, gain controllers, power detectors, or other circuitry. The phase shifters may be controlled by one or more beam controllers for beamforming to reduce signal interference. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming and gain control, signal quality (e.g., mmW signals) may be improved in LOS and NLOS scenarios.

As described, the mmW wireless repeater 140 may include components (e.g., antenna arrays and signal processing chain circuitry) in the analog/RF domain. Accordingly, in some implementations, the mmW wireless repeater may not include any digital components for certain features described herein. For example, the mmW wireless repeater, in some implementations, may not include any digital signal processing functionality that would allow the repeater to decode and interpret the contents of a received mmW signal. As another example, the mmW wireless repeater, in some implementations, may not include any digital signal processing functionality that would allow the repeater to generate new content for a mmWave signal to be sent to another device. In some cases, the mmW wireless repeater may include one or more side channel components that allow the mmW wireless repeater to decode and interpret other types of messages (e.g., non-mmW signals). For example, the mmW wireless repeater may include a side channel communication interface for sending or receiving control messages. The received control messages may include beamforming configurations from a base station 105 or another device. Example side channel communication interfaces may be implemented using one or more of Bluetooth, ultra-wide band, wireless LAN (e.g., IEEE 802.11 Wi-Fi), LTE, or sub-6 GHz NR protocols (or other wireless communication protocols). As such, the repeater may include circuitry and/or processors for transmitting, receiving, and/or processing signals via those protocols and controlling beamforming at the RF/microwave components based on those signals.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 2:
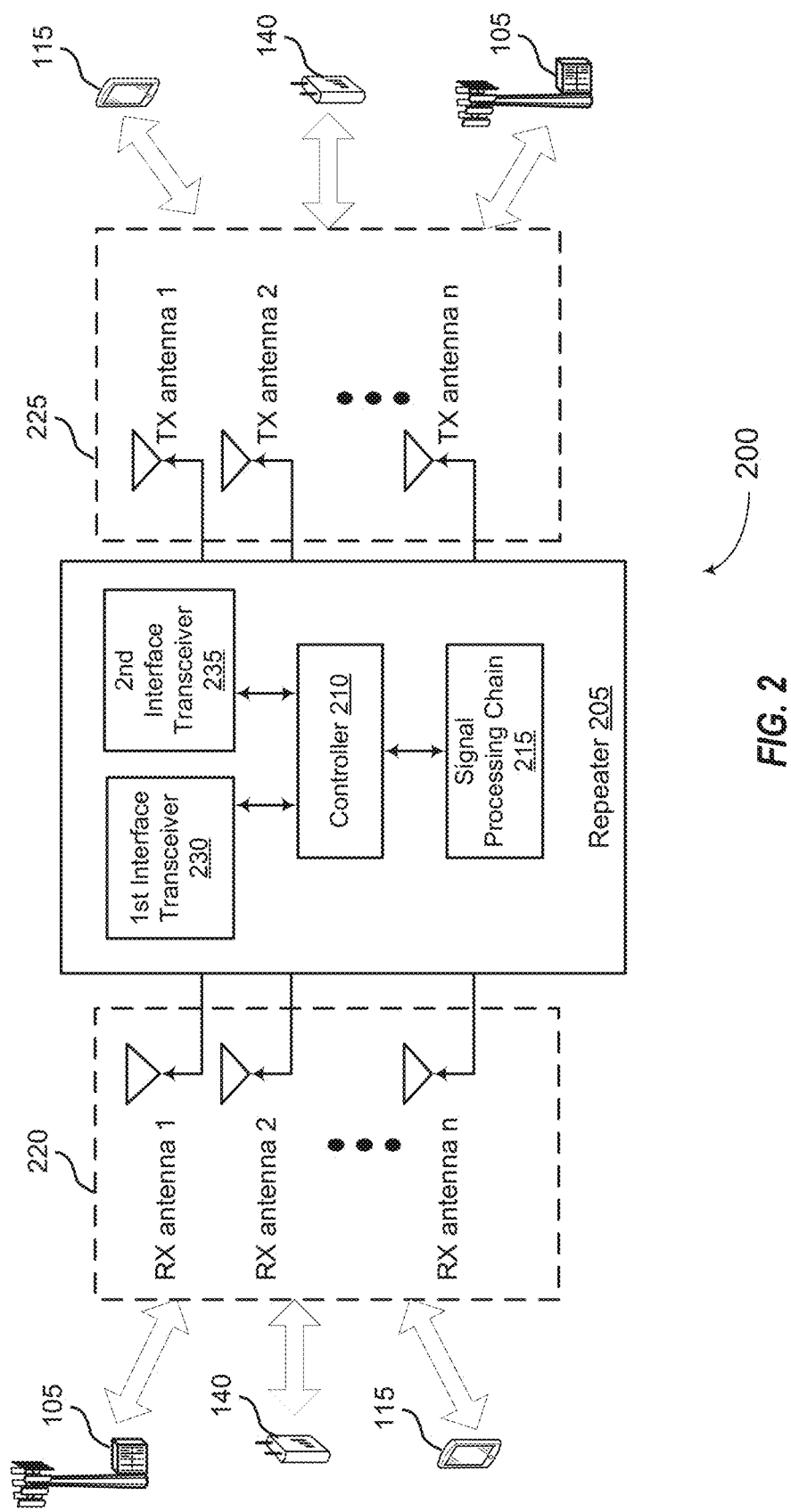
FIG. 2 is a block diagram illustrating an example repeater according to some aspects of the present disclosure.

FIG. 2 is a block diagram 200 illustrating an example repeater 205 according to some aspects of the present disclosure. In some examples, the devices of FIG. 2 may implement aspects of wireless communications system 100, and the repeater 205 may be an example of the repeater 140 of FIG. 1. The repeater 205 includes a reception antenna array 220 including a set of antennas and a transmission antenna array 225 including a set of antennas. In some cases, the reception antenna array 220 and the transmission antenna array 225 are the same antenna arrays including the same set of dual pole antennas functioning in first and second polarizations as the reception and the transmission antenna array. In other cases, the reception antenna array 220 and the transmission antenna array 225 are separate. In some cases, the reception antenna array 220 and/or the transmission antenna array 225 comprise meta-material antennas.

The repeater 205 may further include a controller 210, a signal processing chain 215, a transceiver 230 for a first communication interface (e.g., a non-mmWave interface, such as an interface associated with LTE, sub-6 GHz NR, Wi-Fi, Bluetooth, etc.), and a transceiver 235 for a second communication interface (e.g., a mmWave interface). The non-mmWave interface may use a frequency range that is lower than a frequency range associated with the millimeter wave interface. In some implementations, the signal processing chain 215 includes various circuitry including one or more PAs, LNAs, phase shifters, dividers, and/or combiners. The signal processing chain 215 may include various analog/RF domain components and may be implemented as a RFIC (e.g., MMIC). In some implementations, the signal processing chain 215 may be implemented by a processor coupled with a memory, where the processor executes instructions stored on the memory to implement the signal processing functions of the repeater described herein. Similarly, the controller 210 may comprise a processor coupled with a memory, where the processor executes instructions stored on the memory to implement the controller functions of the repeater described herein. The processor and memory associated with the controller 210 may be the same or different than the processor or memory associated with the signal processing chain 215.

Controller 210 may include a beamformer that controls beam direction and width of the reception antennas 220 and/or the transmission antennas 225 using the phase shifters of the signal processing chain 215 to improve or maintain isolation between various reception and transmission beams. In some cases, the controller 210, using the phase shifters, controls beam direction to ensure target reception and/or transmission beams are sufficiently spread apart to avoid interference. Furthermore, the controller 210 may utilize antenna adjustments to adjust beam width, such as certain amplitude and phase offsets to signals carried via the antenna elements of the reception antenna array 220 and the transmission antenna array 225. In some cases, the adjustments associated with the antenna elements may be defined by a beamforming weight set associated to the antenna arrays 220 and 225.

In some cases, the beam configurations (e.g., width and direction) as well as gain adjustments may be controlled by the base station 105 via a side control channel. The side control channel may operate via the first transceiver 230. For example, the beam controller 210 may be controlled by a base station 105 via a side channel implemented as a Bluetooth channel, ultra-wide band channel, wireless LAN channel, LTE channel, NR sub-6 GHz channel, etc. Accordingly, the repeater 205 may include circuitry for receiving and/or processing side channel communications to control the beam controller 210. The base station 105 may transmit beamforming control configurations based on operating environment, position of a UE, configuration of a UE, and/or other factors (e.g., power measurements made by the repeater).

In some implementations, the repeater 205 uses the first transceiver 230 for sending and/or receiving control messages, and the repeater 205 uses the second transceiver 235 for sending and/or receiving other signals when the repeater 205 is acting as an intermediary between two other devices. For example, the repeater 205 may receive signals from a base station 105 via the second transceiver 235 (associated with a second communication interface of the repeater 205) according to a beamforming configuration and retransmit the signals to a UE 115 via the second transceiver 235 (associated with the second communication interface) according to a beamforming configuration. The repeater 205 may further receive signals from a UE 115 via the second transceiver 235 (associated with the second communication interface) according to a beamforming configuration and retransmit the signals to a base station 105 via the second transceiver 235 (associated with the second communication interface) according to a beamforming configuration. As such, the repeater 205 may function to implement uplink and downlink communications, and the controller 210 and signal processing chain 215 may be utilized for communication in uplink or downlink scenarios. The repeater 205 may also receive signals from one base station 105 via the second transceiver 235 (associated with the second communication interface) according to a beamforming configuration and retransmit the signals to a different base station 105 via the second transceiver 235 (associated with the second communication interface) according to a beamforming configuration (e.g., for wireless backhaul). The repeater 205 may also receive signals from one UE 115 via the second transceiver 235 (associated with the second communication interface) according to a beamforming configuration and retransmit the signals to a different UE 115 via the second transceiver 235 (associated with the second communication interface) according to a beamforming configuration (e.g., D2D or P2P). Additionally, the repeater 205 may also receive signals from another repeater 140 via the second transceiver 235 (associated with the second communication interface) or send signals to another repeater 140 via the second transceiver 235 (associated with the second communication interface) according to a receive and/or transmit beamforming configuration (e.g., in a multi-hop repeater path).

Figure 3:
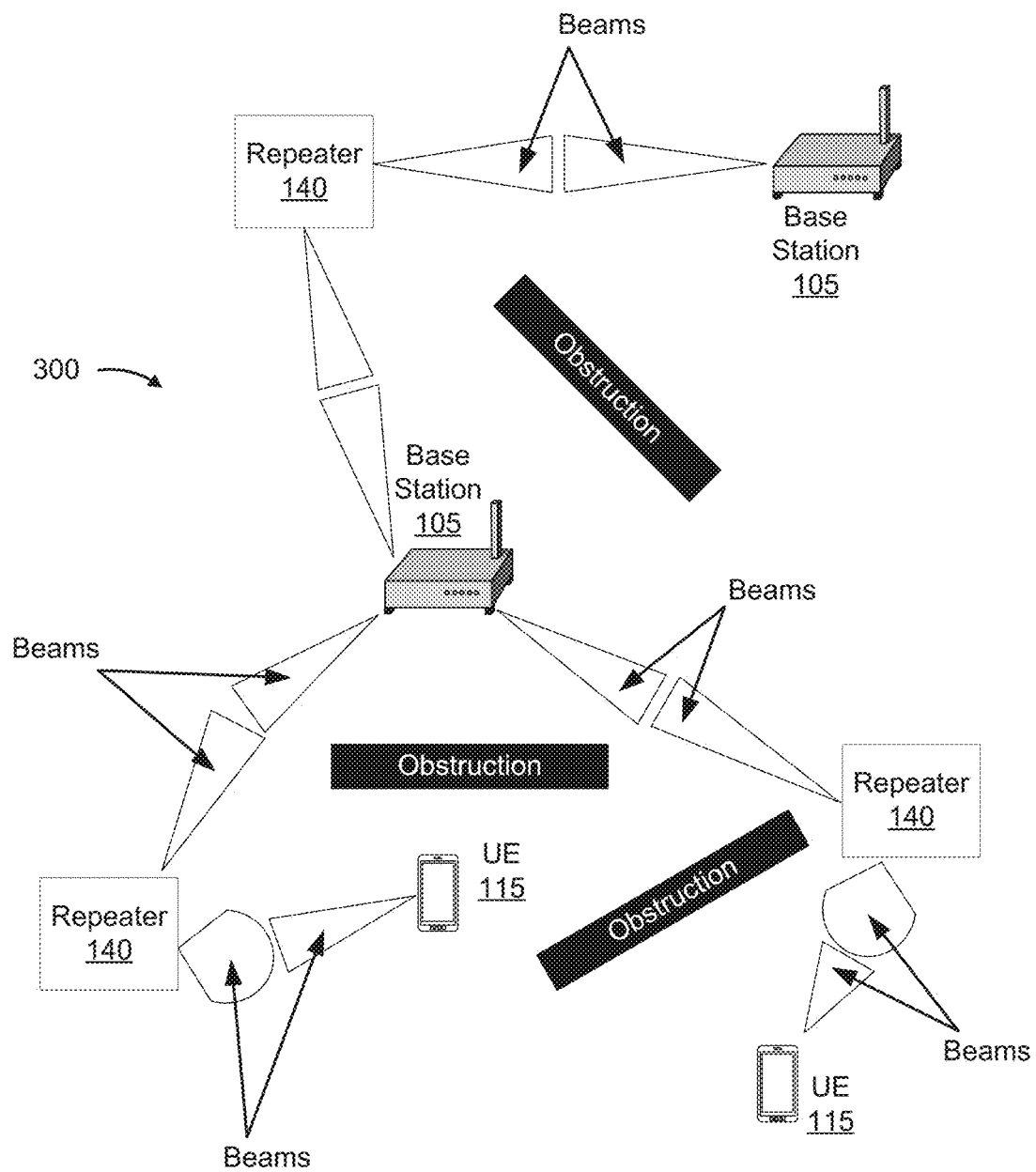
FIG. 3 is a block diagram illustrating details of an example wireless communication system that uses repeaters for wireless communication according to some aspects of the present disclosure.

FIG. 3 is a block diagram illustrating details of an example wireless communication system 300 that uses repeaters 140 for wireless communication according to some aspects of the present disclosure. Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 105 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 105, to extend coverage to UEs 115 without line of sight to the base station 105 (e.g., due to an obstruction), to extend coverage from one base station 105 to another base station 105 (e.g., due to an obstruction or due to other forms of path loss), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 3, a millimeter wave repeater 140 may perform directional communication by using beamforming to communicate with a base station 105 via a first beam (e.g., a backhaul beam over a backhaul link with the base station 105) and to communicate with a UE 115 via a second beam (e.g., an access beam over an access link with the UE 115). Alternatively, the millimeter wave repeater 140 may communicate between two base stations 105 (e.g., in a wireless backhaul link) or between two UEs 115 (e.g., in a D2D or P2P link). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may use resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 105. As shown in FIG. 3, the millimeter wave repeater 140 may use a narrower beam to communicate with the base station 105 without unnecessarily consuming network resources and/or resources of the millimeter wave repeater 140 because the need for beam training, beam maintenance, and/or beam management may be limited, due to limited or no mobility of the base station 105 and the millimeter wave repeater 140 (and/or due to a line of sight communication path between the base station 105 and the millimeter wave repeater 140).

As further shown in FIG. 3, the millimeter wave repeater 140 may use a wider beam (e.g., a pseudo-omnidirectional beam and/or the like) to communicate with one or more UEs 115. This wider beam may provide wider coverage for access links, thereby providing coverage to mobile UEs 115 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities on the mmWave communication interface, resources of the base station 105 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 105 and the millimeter wave repeater 140. In this way, the millimeter wave repeater 140 may increase a coverage area, provide access around obstructions (as shown), and/or the like, while conserving resources of the base station 105, resources of the millimeter wave repeater 140, network resources, and/or the like.

In general, a repeater may be a simple and cost-effective way to improve network coverage. As mentioned previously, additional information, e.g., side information, may also be received through side channels to further improve the performance of a repeater. In some aspects, side information may include timing information, such as slot, symbol, sub-frame, and/or frame boundary information associated with wireless communication. In additional aspects, side information may also include TDD uplink/downlink configuration information, ON-OFF scheduling information, and/or spatial information for beam management.

In some aspects, repeaters may be designed and/or configured in a variety of ways to include one or more of the features associated with any of the repeaters described herein. For example, some repeaters, such as traditional repeaters, may be configured without any side information. Some repeaters, such as autonomous smart repeaters, may be configured to acquire and/or infer at least some wireless communication configuration information. For example, a repeater may be configured to acquire or infer information by receiving and decoding broadcast channels, and/or application-layer signaling from a third-party node (e.g. a server node) that is associated with a network control node. Other repeaters, such as network-controlled repeaters, may be configured with side information by a network control node, e.g., a gNB, via an established control interface. In some aspects, all side information may be provided by a gNB. In additional aspects, some side information may be configured by a gNB, and some side information may be acquired or inferred by the repeater itself, e.g., to reduce control overhead and/or latency.

As mentioned previously, a repeater may be equipped with a power detector so that it can measure the power of received signals. According to some aspects, having the capability to measure power may yield multiple potential benefits. For example, through received-signal power measurements, a repeater may be able to acquire TDD information so that the repeater can differentiate between downlink and uplink symbols. In some aspects, through received-signal power measurements, a repeater may be able to acquire beamforming configuration information. For example, a repeater may measure received-signal power on various reception beams and find a proper beamforming configuration for later communications. In some additional aspects, through received-signal power measurements, a repeater may determine whether there is an incoming signal. According to some aspects, if the repeater determines that there is no incoming signal, the repeater may turn off to save power and reduce interference.

In some aspects, such as when 5G NR technology is used for wireless communication, the operation bandwidth can be quite large. For example, in some aspects, the operation bandwidth can be in the hundreds of MHz range for the FR2 band and even several GHz at higher bands. According to some aspects, however, the desired signals for wireless communication via a repeater may occupy only a fraction of the total available operation bandwidth. As an example, a UE may be allocated multiple carriers that can be used for wireless communication, some of which can be activated and some of which can be deactivated at any given time. According to some aspects, within a carrier, wireless communication may be performed using only resources associated with an active bandwidth part (BWP) configured for a UE. In some aspects, multiple BWPs per carrier may be configured for a UE, and only one of them may be active at a time.

Because desired signals may occupy only a fraction of the total available operation bandwidth, aspects of this disclosure may provide techniques for measuring signal power within repeaters on a sub-band basis and for operating repeaters based on sub-band power measurements. According to some aspects, sub-band-based power measurements may allow a repeater to make more accurate decisions regarding the presence of signals and to better distinguish signals from wideband noise. In additional aspects, sub-band-based power measurements may also allow a repeater to acquire other side information, e.g., TDD downlink/uplink information or beam configuration information, more accurately.

Figure 4:
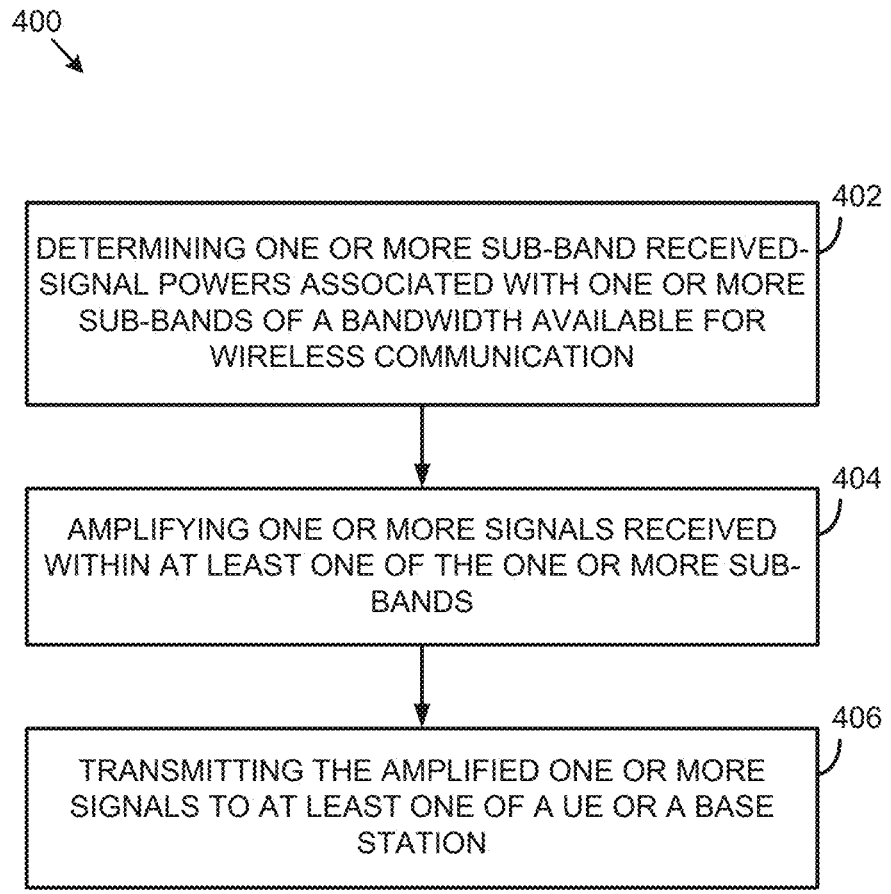
FIG. 4 is a block diagram illustrating a method for operating repeaters based on sub-band power measurements according to some aspects of the present disclosure.

FIG. 4 is a block diagram illustrating method 400 for operating repeaters based on sub-band power measurements according to some aspects of the present disclosure. Aspects of method 400 may be implemented with various other aspects of this disclosure described with respect to FIGS. 1-3 and 5, such as any of the repeaters illustrated. For example, method 400 may be performed by repeater 140, and/or repeater 205.

At block 402, a repeater, such as repeater 140, may determine one or more sub-band received-signal powers associated with one or more sub-bands of a bandwidth available for wireless communication. In aspects, a repeater may measure, on a sub-band basis, powers of signals received within sub-bands of a bandwidth available for wireless communication. As one example, the bandwidth available for wireless communication may correspond to a bandwidth associated with a carrier, such as one or more BWPs. By contrast, a sub-band may correspond to one or more subcarriers associated with a carrier, such as one or more subcarriers within a BWP. As such, a carrier or BWP may include one or more sub-bands.

According to some aspects, a repeater may determine one or more sub-band received-signal powers associated with one or more sub-bands of a bandwidth available for wireless communication, such as at block 402, in a variety of ways. For example, in some aspects, a repeater, such as an analog repeater, may utilize a set of one or more sub-band filters in the analog domain, e.g., RF or intermediate-frequency (IF) filters, to divide the bandwidth available for reception of wireless communications into one or more sub-bands. According to some aspects, each sub-band filter may be associated with its own center frequency and bandwidth. In additional aspects, a repeater, such as a digital repeater, with fast Fourier Transform (FFT)/inverse fast Fourier Transform (IFFT) functionality may be configured to process received signals and perform power measurements on a sub-band basis. As a result of the foregoing filtering, according to some aspects, a repeater may be able to filter out noise at unused sub-bands and improve the overall end-to-end signal-to-noise ratio (SNR) performance.

In some aspects, a desired signal intended to be processed by a repeater may be present in each of the sub-bands for which sub-band power measurements are performed. In additional aspects, a desired signal intended to be processed by a repeater may be present in a subset of the sub-bands for which sub-band power measurements are performed.

At block 404, a repeater may amplify one or more signals received within at least one of the one or more sub-bands. In some aspects, the at least one of the one or more sub-bands associated with the one or more signals that get amplified, such as at block 404, may correspond to all of the sub-bands of the bandwidth available for wireless communication for which sub-band power measurements were performed, such as at block 402. In such aspects, all signals within the at least one of the one or more sub-bands may get amplified equally.

In additional aspects, the at least one of the one or more sub-bands associated with the one or more signals that get amplified, such as at block 404, may correspond to a subset of the sub-bands of the bandwidth available for wireless communication for which sub-band power measurements were performed, such as at block 402. In such aspects, signals within the subset of the sub-bands may get amplified while signals not within the subset of the sub-bands may not get amplified. In other words, according to some aspects, only the one or more signals received within the at least one of the one or more sub-bands may be amplified such that amplification is not applied to one or more other signals not received within the at least one of the one or more sub-bands. As a result, according to some aspects, a repeater may be able to filter out noise at unused sub-bands and improve the overall end-to-end SNR performance.

In some aspects, a repeater may utilize a threshold to determine whether or not to amplify signals. For example, in some aspects, a repeater may amplify, such as at block 404, the one or more signals based, at least in part, on at least one sub-band received-signal power associated with the at least one of the one or more sub-bands exceeding a power threshold. According to some aspects, all of the one or more signals received within at least one of the one or more sub-bands may be amplified when at least one sub-band received-signal power associated with the at least one of the one or more sub-bands exceeds the power threshold. In additional aspects, only the one or more signals received within sub-bands that are associated with sub-band power levels that exceed the power threshold may be amplified, while signals received within sub-bands that are associated with sub-band power levels that do not exceed the power threshold may not be amplified.

At block 406, a repeater may transmit the amplified one or more signals to at least one of a UE or a base station. In some aspects, the signals may be received by the repeater from a UE or a gNB and may be transmitted by the repeater to a UE or a gNB.

In some aspects, a repeater may perform additional operations based on sub-band power measurements. For example, in some aspects, a repeater may turn on or off a receive path of the repeater based, at least in part, on the determined one or more sub-band received-signal powers. As an example, a repeater may turn on a receive path of the repeater when one or more of the determined one or more sub-band received-signal powers exceed a power threshold. In additional aspects, the repeater may turn off a receive path of the repeater when one or more of the determined one or more sub-band received-signal powers do not exceed a power threshold. In some aspects, the power threshold used for turning on or off receive paths may be the same threshold used to determine whether or not to amplify signals. In additional aspects, the power threshold used for turning on or off receive paths may be a different threshold, e.g., a second threshold, than the threshold used to determine whether or not to amplify signals. In some aspects, a receive path may be a path of the repeater through which signals are received and processed before being subsequently forwarded to another wireless communication device.

According to some aspects, a repeater may also be configured to determine a beamforming configuration based, at least in part, on the determined one or more sub-band received-signal powers. As an example, a repeater may determine to use a first beamforming configuration when one or more of the determined one or more sub-band received-signal powers exceed a power threshold. In additional aspects, the repeater may determine to use a second beamforming configuration, or no beamforming configuration at all, when one or more of the determined one or more sub-band received-signal powers do not exceed a power threshold. In some aspects, the power threshold used for determining beamforming configurations may be the same as the threshold used to determine whether or not to amplify signals. In additional aspects, the power threshold used for determining beamforming configurations may be a different threshold, e.g., a third threshold, than the threshold used to determine whether or not to amplify signals. According to some aspects, a beamforming configuration may be a beamforming pattern.

In some aspects, a repeater may communicate with a base station, such as a gNB, to transmit and/or receive information that may be used to aid the repeater in performing operations described in this disclosure. For example, in some aspects, a repeater may transmit, e.g., to a base station, an indication of the repeater's ability to determine, on a sub-band basis, the one or more sub-band received-signal powers associated with the one or more sub-bands. As an example, a repeater may indicate a number of sub-bands that can be supported by the repeater for sub-band-based power measurements and additional processing. In additional aspects, a repeater may indicate the frequency and/or bandwidth of sub-bands that can be supported by the repeater for sub-band-based power measurements and additional processing.

According to some aspects, a base station may also communicate information to a repeater to aid the repeater in performing operations described in this disclosure. For example, in some aspects, a base station may transmit to a repeater configuration information, such as configuration information associated with carriers used for wireless communication, BWPs used for wireless communication, and/or frequency-domain resources allocated for wireless communication via the repeater. In some aspects, a base station may determine the configuration information to transmit to a repeater based, at least in part, on information received from the repeater, such as an indication of the repeater's ability to determine, on a sub-band basis, the one or more sub-band received-signal powers associated with the one or more sub-bands. As an example, based on information received from the repeater that indicates sub-bands supported by the repeater, the base station may configure the carrier that includes those supported sub-bands to include guard tones between the repeater-supported sub-bands.

In some aspects, a base station may communicate additional information to a repeater to aid the repeater in performing operations described in this disclosure. For example, in some aspects, a base station may transmit to a repeater one or more indications of one or more thresholds to be used by the repeater for sub-band-based power measurements and subsequent processing. In additional aspects, a base station may transmit to a repeater configuration information associated with the number of carriers supported by the base station, the frequencies and/or bandwidths associated with carriers supported by the base station, and/or the BWP configurations associated with UEs. According to some additional aspects, a base station may also transmit to a repeater configuration information for sub-band-based power measurements and additional processing, such as configuration information associated with a number of sub-bands, frequencies and/or bandwidths associated with sub-bands, and/or power thresholds associated with processing of information obtained based on sub-band-based power measurements. In some aspects, a threshold set by a base station for use by the repeater during processing of information obtained based on sub-band-based power measurements may be a function of beam direction at a repeater. For example, in some aspects, a certain beam direction may require a lower threshold when considering the fact that the coverage range of each beam may vary.

In general, according to some aspects, as described above, a repeater may be configured to receive, e.g., from a base station, configuration information associated with a variety of wireless communication features that may be used by the repeater to aid the repeater in performing operations described in this disclosure. For example, as described above, the repeater may receive configuration information associated with at least one of the one or more sub-bands, the bandwidth available for wireless communication, the one or more sub-band received-signal powers, or a power threshold. In additional aspects, as previously described, the repeater may receive such configuration information based, at least in part, on the repeater-transmitted indication of the repeater's capabilities.

According to some aspects, a base station may transmit configuration information to a repeater in a variety of ways. For example, in some aspects, a base station may transmit configuration information to a repeater using broadcast/multi-cast signaling messages, application layer signaling messages, and/or a dedicated signal messages.

In one or more aspects, techniques for operating repeaters based on sub-band power measurements according to one or more aspects may include additional aspects, such as any single aspect or any combination of aspects described below or in connection with one or more other processes or devices described elsewhere herein. In a first aspect, operating repeaters based on sub-band power measurements in a wireless communication system may include an apparatus configured to determine one or more sub-band received-signal powers associated with one or more sub-bands of a bandwidth available for wireless communication, to amplify one or more signals received within at least one of the one or more sub-bands, and to transmit the amplified one or more signals to at least one of a UE or a base station. Additionally, the apparatus may perform or operate according to one or more aspects as described below. In some implementations, the apparatus includes a wireless device, such as repeater. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, only the one or more signals received within the at least one of the one or more sub-bands are amplified such that amplification is not applied to one or more other signals not received within the at least one of the one or more sub-bands.

In a third aspect, alone or in combination with one or more of the first aspect or the second aspect, the techniques of the first aspect further comprise amplifying the one or more signals based, at least in part, on at least one sub-band received-signal power associated with the at least one of the one or more sub-bands exceeding a power threshold.

In a fourth aspect, alone or in combination with one or more of the first aspect through the third aspect, the techniques of the first aspect further comprise turning on or off a receive path of the wireless communication device based, at least in part, on the determined one or more sub-band received-signal powers.

In a fifth aspect, alone or in combination with one or more of the first aspect through the fourth aspect, the techniques of the first aspect further comprise determining a beamforming configuration based, at least in part, on the determined one or more sub-band received-signal powers.

In a sixth aspect, alone or in combination with one or more of the first aspect through the fifth aspect, the techniques of the first aspect further comprise receiving configuration information associated with at least one of the one or more sub-bands, the bandwidth available for wireless communication, the one or more sub-band received-signal powers, or a power threshold.

In a seventh aspect, alone or in combination with one or more of the first aspect through the sixth aspect, the techniques of the first aspect further comprise transmitting an indication of the wireless communication device's ability to determine, on a sub-band basis, the one or more sub-band received-signal powers associated with the one or more sub-bands.

In an eighth aspect, alone or in combination with one or more of the first aspect through the seventh aspect, the techniques of the first aspect further comprise receiving configuration information associated with at least one of the one or more sub-bands, the bandwidth available for wireless communication, the one or more sub-band received-signal powers, or a power threshold based, at least in part, on the transmitted indication.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a wireless communication device, the method comprising:
    for each of two or more of a plurality of sub-bands of a bandwidth available for wireless communication, determining a respective sub-band received-signal power associated with the respective sub-band as a whole;
    based on which of the respective sub-band received-signal powers of the two or more sub-bands respectively satisfies a predefined threshold condition, which is dependent on how the respective sub-band received-signal powers respectively compare to a threshold power level, selectively amplifying one or more signals received within only those of the two or more sub-bands whose respective sub-band received-signal powers satisfy the predefined threshold condition; and
    transmitting the amplified one or more signals to at least one of a user equipment (UE) or a base station.

2. The method of claim 1, wherein, based on the determinations regarding the satisfaction of the predefined threshold condition, signals received within the at least one of the sub-bands for which the respective sub-band received-signal power is determined not to satisfy the predefined threshold condition are not amplified.

3. The method of claim 1, wherein the predefined threshold condition is that the respective sub-band received-signal power associated with the respective sub-band exceeds the threshold power level.

4. The method of claim 1, further comprising turning on or off a receive path of the wireless communication device based, at least in part, on the determined sub-band received-signal powers.

5. The method of claim 1, further comprising determining a beamforming configuration based, at least in part, on the determined sub-band received-signal powers.

6. The method of claim 1, further comprising receiving configuration information associated with at least one of the plurality of sub-bands, the bandwidth available for wireless communication, the sub-band received-signal powers, or threshold power level.

7. The method of claim 1, further comprising transmitting an indication of the wireless communication device's ability to determine, on a sub-band basis, the sub-band received-signal powers associated with the two or more sub-bands.

8. The method of claim 7, further comprising receiving configuration information associated with at least one of the sub-bands, the bandwidth available for wireless communication, the sub-band received-signal powers, or threshold power level based, at least in part, on the transmitted indication.

9. A wireless communication device, comprising:
at least one processor; and
a memory coupled to the at least one processor,
wherein the at least one processor is configured to:
for each of two or more of a plurality of sub-bands of a bandwidth available for wireless communication, determine a respective sub-band received-signal power associated with the respective sub-band as a whole;
based on which of the respective sub-band received-signal powers of the two or more sub-bands respectively satisfies a predefined threshold condition, which is dependent on how the respective sub-band received-signal powers respectively compare to a threshold power level, selectively amplify one or more signals received within only those of the two or more sub-bands whose respective sub-band received-signal powers satisfy the predefined threshold condition; and
transmit the amplified one or more signals to at least one of a user equipment (UE) or a base station.

10. The wireless communication device of claim 9, wherein, based on the determinations regarding the satisfaction of the predefined threshold condition, signals received within the at least one of the sub-bands for which the respective sub-band received-signal power is determined not to satisfy the predefined threshold condition are not amplified.

11. The wireless communication device of claim 9, wherein the predefined threshold condition is that the respective sub-band received-signal power associated with the respective sub-band exceeds the threshold power level.

12. The wireless communication device of claim 9, wherein the at least one processor is further configured to turn on or off a receive path of the wireless communication device based, at least in part, on the determined sub-band received-signal powers.

13. The wireless communication device of claim 9, wherein the at least one processor is further configured to determine a beamforming configuration based, at least in part, on the determined sub-band received-signal powers.

14. The wireless communication device of claim 9, wherein the at least one processor is further configured to receive configuration information associated with at least one of the plurality of sub-bands, the bandwidth available for wireless communication, the sub-band received-signal powers, or threshold power level.

15. The wireless communication device of claim 9, wherein the at least one processor is further configured to transmit an indication of the wireless communication device's ability to determine, on a sub-band basis, the sub-band received-signal powers associated with the two or more sub-bands.

16. The wireless communication device of claim 15, wherein the at least one processor is further configured to receive configuration information associated with at least one of the sub-bands, the bandwidth available for wireless communication, the sub-band received-signal powers, or threshold power level based, at least in part, on the transmitted indication.

17. A wireless communication device configured for wireless communication, comprising:
means for, for each of two or more of a plurality of sub-bands of a bandwidth available for wireless communication, determining a respective sub-band received-signal power associated with the respective sub-band as a whole;
means for, based on which of the respective sub-band received-signal powers of the two or more sub-bands respectively satisfies a predefined threshold condition, which is dependent on how the respective sub-band received-signal powers respectively compare to a threshold power level, selectively amplifying one or more signals received within only those of the two or more sub-bands whose respective sub-band received-signal powers satisfy the predefined threshold condition; and
means for transmitting the amplified one or more signals to at least one of a user equipment (UE) or a base station.

18. The wireless communication device of claim 17, wherein, based on the determinations regarding the satisfaction of the predefined threshold condition, signals received within the at least one of the sub-bands for which the respective sub-band received-signal power is determined not to satisfy the predefined threshold condition are not amplified.

19. The wireless communication device of claim 17, wherein the predefined threshold condition is that the respective sub-band received-signal power associated with the respective sub-band exceeds the threshold power level.

20. The wireless communication device of claim 17, further comprising means for turning on or off a receive path of the wireless communication device based, at least in part, on the determined sub-band received-signal powers.

21. The wireless communication device of claim 17, further comprising means for determining a beamforming configuration based, at least in part, on the determined sub-band received-signal powers.

22. The wireless communication device of claim 17, further comprising means for receiving configuration information associated with at least one of the plurality of sub-bands, the bandwidth available for wireless communication, the sub-band received-signal powers, or threshold power level.

23. The wireless communication device of claim 17, further comprising:
means for transmitting an indication of the wireless communication device's ability to determine, on a sub-band basis, the sub-band received-signal powers associated with the two or more sub-bands; and
means for receiving configuration information associated with at least one of the sub-bands, the bandwidth available for wireless communication, the sub-band received-signal powers, or threshold power level based, at least in part, on the transmitted indication.

24. A non-transitory computer-readable medium having program code recorded thereon, the program code comprising program code executable by a computer of a wireless communication device for causing the computer to:

for each of two or more of a plurality of sub-bands of a bandwidth available for wireless communication, determine a respective sub-band received-signal power associated with the respective sub-band as a whole;

based on which of the respective sub-band received-signal powers of the two or more sub-bands respectively satisfies a predefined threshold condition, which is dependent on how the respective sub-band received-signal powers respectively compare to a threshold power level, selectively amplify one or more signals received within only those of the two or more sub-bands whose respective sub-band received-signal powers satisfy the predefined threshold condition; and transmit the amplified one or more signals to at least one of a user equipment (UE) or a base station.

25. The non-transitory computer-readable medium of claim 24, wherein, based on the determinations regarding the satisfaction of the predefined threshold condition, signals received within the at least one of the sub-bands for which the respective sub-band received-signal power is determined not to satisfy the predefined threshold condition are not amplified.

26. The non-transitory computer-readable medium of claim 24, wherein the predefined threshold condition is that the respective sub-band received-signal power associated with the respective sub-band exceeds the threshold power level.

27. The non-transitory computer-readable medium of claim 24, further comprising program code executable by the computer for causing the computer to turn on or off a receive path of the wireless communication device based, at least in part, on the determined sub-band received-signal powers.

28. The non-transitory computer-readable medium of claim 24, further comprising program code executable by the computer for causing the computer to determine a beamforming configuration based, at least in part, on the determined sub-band received-signal powers.

29. The non-transitory computer-readable medium of claim 24, further comprising program code executable by the computer for causing the computer to receive configuration information associated with at least one of the plurality of sub-bands, the bandwidth available for wireless communication, the sub-band received-signal powers, or threshold power level.

30. The non-transitory computer-readable medium of claim 24, further comprising program code executable by the computer for causing the computer to:
    transmit an indication of the wireless communication device's ability to determine, on a sub-band basis, the sub-band received-signal powers associated with the two or more sub-bands; and
    receive configuration information associated with at least one of the sub-bands, the bandwidth available for wireless communication, the sub-band received-signal powers, or threshold power level based, at least in part, on the transmitted indication.

* * * * *